United States Patent
Fei et al.

(10) Patent No.: US 10,974,238 B2
(45) Date of Patent: Apr. 13, 2021

(54) PROCESS FOR COMBUSTION COKE FROM COKED CATALYST

(71) Applicant: UOP LLC, Des Plaines, IL (US)

(72) Inventors: Zhihao Fei, Naperville, IL (US); Lisa M. Wolschlag, Aurora, IL (US); Brian W. Hedrick, Oregon, IL (US)

(73) Assignee: UOP LLC, Des Plaines, IL (US)

( * ) Notice: Subject to any disclaimer, the term of this patent is extended or adjusted under 35 U.S.C. 154(b) by 302 days.

(21) Appl. No.: 16/039,091

(22) Filed: Jul. 18, 2018

(65) Prior Publication Data

US 2018/0318821 A1 Nov. 8, 2018

Related U.S. Application Data

(63) Continuation of application No. PCT/US2017/023573, filed on Mar. 22, 2017.

(60) Provisional application No. 62/316,487, filed on Mar. 31, 2016.

(51) Int. Cl.

| | |
|---|---|
| *B01J 38/26* | (2006.01) |
| *B01J 38/34* | (2006.01) |
| *B01J 38/04* | (2006.01) |
| *B01J 8/34* | (2006.01) |
| *B01J 8/00* | (2006.01) |
| *B01J 8/26* | (2006.01) |
| *B01J 8/28* | (2006.01) |
| *B01J 38/30* | (2006.01) |
| *C10G 11/18* | (2006.01) |
| *B01J 29/90* | (2006.01) |

(52) U.S. Cl.
CPC .............. *B01J 38/26* (2013.01); *B01J 8/003* (2013.01); *B01J 8/008* (2013.01); *B01J 8/0025* (2013.01); *B01J 8/0055* (2013.01); *B01J 8/0065* (2013.01); *B01J 8/26* (2013.01); *B01J 8/28* (2013.01); *B01J 8/34* (2013.01); *B01J 38/04* (2013.01); *B01J 38/30* (2013.01); *B01J 38/34* (2013.01); *C10G 11/182* (2013.01); *B01J 29/90* (2013.01); *B01J 2208/00752* (2013.01); *B01J 2208/00769* (2013.01); *B01J 2208/00902* (2013.01); *B01J 2208/00938* (2013.01); *B01J 2208/00991* (2013.01); *C10G 2300/207* (2013.01); *C10G 2300/708* (2013.01)

(58) Field of Classification Search
CPC . B01J 38/26; B01J 8/0025; B01J 8/003; B01J 8/0055; B01J 8/0065; B01J 8/008; B01J 8/26; B01J 8/28; B01J 8/34; B01J 38/04; B01J 38/30; B01J 38/34; B01J 29/90; B01J 2208/00752; B01J 2208/00769; B01J 2208/00902; B01J 2208/00938; B01J 2208/00991; C10G 11/182; C10G 2300/207; C10G 2300/708
USPC .......................................................... 502/47
See application file for complete search history.

(56) References Cited

U.S. PATENT DOCUMENTS

| | | |
|---|---|---|
| 2,509,751 A | 5/1950 | Merle |
| 2,581,670 A | 1/1952 | Kassel |
| 5,215,720 A | 6/1993 | Cetinkaya |

OTHER PUBLICATIONS

Extended European Search Report dated Oct. 16, 2019 for corresponding EP Application No. 17776326.5.
Examination Report dated Jul. 27, 2019 for corresponding Indian Application No. 201817020302.

*Primary Examiner* — Edward M Johnson
(74) *Attorney, Agent, or Firm* — Paschall & Associates, LLC; James C. Paschall

(57) ABSTRACT

A counter-current catalyst regenerator with at least two stages of counter-current contact is proposed. Each stage may comprise a permeable barrier that allows upward passage of oxygen-containing gas and downward passage of coked catalyst into each stage, but inhibits upward movement of catalyst to mitigate back mixing and approximate true counter-current contact and efficient combustion of coke from catalyst.

15 Claims, 3 Drawing Sheets

PROCESS FOR COMBUSTION COKE FROM COKED CATALYST

CROSS-REFERENCE TO RELATED APPLICATIONS

This application is a Continuation of International Application No. PCT/US2017/023573 filed Mar. 22, 2017, which application claims priority from U.S. Provisional Application No. 62/316,487 filed Mar. 31, 2016, the contents of which cited applications are hereby incorporated by reference in their entirety.

FIELD

The field of the subject matter relates to catalyst regeneration in fluidized catalytic cracking units, and more particularly relates to a counter-current catalyst regenerator.

BACKGROUND

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst. A high temperature regeneration operation within a regeneration zone combusts coke from the catalyst. Coke-containing catalyst, referred to herein as coked catalyst, is continually removed from a reactor and replaced by essentially coke-free catalyst from a regenerator.

A common objective of FCC units is maximizing product yield from the reactor while minimizing operating and equipment costs. Optimization of feedstock conversion ordinarily requires essentially complete removal of coke from the catalyst referred to as complete or full burn regeneration. Complete regeneration produces a catalyst having less than 0.1 and preferably less than 0.05 wt % coke. In order to obtain complete regeneration, the catalyst has to be in contact with oxygen for sufficient residence time to permit thorough combustion of coke. Partial regeneration occurs when complete regeneration does not occur. Partial regeneration occurs when regeneration produces a catalyst having at least 0.1 and commonly at least 0.05 and typically at least 0.03 wt % coke.

In the regenerator, the coke is burned from the catalyst with oxygen-containing gas, usually air. Flue gas formed by burning coke in the regenerator is treated for removal of particulates and conversion of carbon monoxide, after which the flue gas may be normally discharged into the atmosphere. Conventional regenerators typically include a vessel having a coked catalyst inlet, a regenerated catalyst outlet and a combustion gas distributor for supplying air or other oxygen-containing gas to the catalyst that resides in the vessel. Cyclone separators remove catalyst entrained in the flue gas before the flue gas exits the regenerator vessel in a flue gas exit. A regenerator typically includes a dilute phase and a dense phase bed of fluidized catalyst disposed in respective upper and lower regions of the vessel.

The main goal of the regenerator is to burn the coke off the catalyst, so high coke burn efficiency is preferred because it will reduce the equipment size, operational cost and emission levels. Fast combustion rate can reduce the catalyst residence time in the regenerator. The conditions of high temperature and the presence of steam in the regenerator can deactivate the catalyst, so short residence time is preferred. However, the combustion rate must be controlled because an excessive combustion rate can generate localized hot spots from too much rapid combustion which can damage the catalyst structure and the regenerator equipment from excessive heat.

After burn is a phenomenon that occurs when hot flue gas that has been separated from regenerated catalyst contains carbon monoxide that combusts to carbon dioxide in a dilute phase of catalyst containing oxygen. Insufficient catalyst is present in the dilute phase to serve as a heat sink to absorb the heat of combustion thus subjecting surrounding equipment to excessively high temperatures that can exceed metallurgical limits and perhaps creating an atmosphere conducive to the generation of nitrous oxides that are undesirable for the environment. Incomplete combustion to carbon dioxide can result from insufficient oxygen in the combustion gas, poor fluidization or aeration of the coked catalyst in the regenerator vessel or poor distribution of coked catalyst in the regenerator vessel.

Because FCC units that process heavy residue feed generate more heat than is needed to promote the cracking reaction it is desirable to control the regeneration temperature and heat release to the reactor. The two most common ways to control regeneration temperature are to control the ratio of carbon dioxide to carbon monoxide and to use catalyst coolers to generate steam and cool the catalyst. It is most economical to run at the highest carbon monoxide concentration possible in the flue gas because the heat of combustion of CO to $CO_2$ can be recovered in a CO boiler in which super-heated steam is generated instead of saturated steam which is generated by removing the same amount of heat using a catalyst cooler. However, operating at a low $CO_2$-to-CO ratio carries the risk of after burn.

As bubbling beds are designed larger it becomes increasingly difficult to mix the catalyst laterally evenly. Consequently, the region near the catalyst inlet tends to have a higher carbon concentration, from top to bottom than the region opposite the catalyst inlet. Flue gas produced in the carbon rich zone tends to be richer in carbon monoxide than in the zone on the opposite side of the regenerator and, in extreme cases there may even be oxygen break-through which can cause after burn.

There are several types of catalyst regenerators in use today. A conventional bubbling bed regenerator typically has just one chamber in which air is bubbled through a dense catalyst bed. Coked catalyst is added, and regenerated catalyst is withdrawn from the same dense catalyst bed. Relatively little catalyst is entrained in the combustion gas exiting the dense bed. When a single bubbling bed is used to regenerate the catalyst at maximum carbon monoxide generation the catalyst is not completely regenerated. In order to maximize the regenerated catalyst activity at a given make up catalyst rate, the carbon on catalyst must be reduced to a minimum.

Most modern residue cracking units use a two-stage bubbling bed regenerator to finish the catalyst clean up and reduce the carbon on catalyst to a minimum. Two-stage bubbling beds have two chambers. Coked catalyst is added to a dense bed in an upper, first chamber and is partially regenerated with air in flue gas from a second stage. The partially regenerated catalyst is transported to a dense bed in a lower, second chamber and completely regenerated with air. The completely regenerated catalyst is withdrawn from the second chamber. The second stage is generally operated in complete combustion where all carbon monoxide is converted to carbon dioxide and an excess of oxygen is present in the flue gas.

In a one or two-stage fluidized bubbling bed regenerator, catalyst lifted upwardly by air distributed into the regenerator falls non-uniformly in a phenomenon called back mixing. In bubbling beds, the catalyst phase is back mixed from top to bottom while the gas phase is nearly plug flow with a high oxygen concentration at the bottom and low oxygen concentration at the top. Back mixing causes the residence time to increase and the combustion rate to be non-uniform which can generate hot spots, increase catalyst deactivation and reduce combustion efficiency. Back mixing also lowers the catalyst bed density thereby increasing the equipment size.

Therefore, there is a need for improved processes and apparatuses for efficiently regenerating catalyst while preventing after burn and back mixing. There is a need for a process and an apparatus to better control coke and oxygen concentration and temperature profiles in a regenerator which promotes more efficient combustion of coke from catalyst.

SUMMARY

The disclosed subject matter is a counter-current catalyst regenerator with at least two stages of counter-current contact. Each stage may comprise a permeable barrier that allows upward passage of oxygen-containing gas and downward passage of coked catalyst into each stage, but inhibits upward movement of catalyst to mitigate back mixing and approximate true counter-current contact and efficient combustion of coke from catalyst.

DETAILED DESCRIPTION

A new regenerator is proposed in which catalyst and gas flow counter-currently to each other in multiple stages. A permeable barrier above each stage may facilitate counter-current flow of catalyst by mitigating catalyst back mixing. The permeable barrier can also have a structure that facilitates effective mixing between catalyst and combustion gas. Each stage may also include a chamber of open volume between adjacent permeable barriers. A catalyst flows downwardly from a stage through a subjacent permeable barrier and oxygen-containing gas flows upwardly from the stage through superjacent permeable barrier. A plurality of stages may be assembled in the regenerator vessel to approach true counter-current flow conditions.

In the new regenerator, catalyst flow and catalyst residence time are more uniform. The residence time necessary for the catalyst to achieve complete coke burn can be accurately controlled and therefore reduced. The deactivation of catalyst due to randomly long residence time can be avoided. Additionally, the counter-current flow regime generates a favored concentration profile along the regenerator vessel. At the top, initial stage, the catalyst has the highest coke concentration but the combustion gas has a low oxygen concentration, so after burn can be avoided. At the bottom, last stage, the oxygen-containing gas has the highest oxygen concentration, but the catalyst has the lowest coke concentration, so again the over burn can be prevented.

Catalyst density can be increased in the regenerator vessel because the catalyst downward flow pattern is more uniform. Consequently, for the same catalyst inventory, the regenerator size can be smaller. Additionally, because the oxygen concentration can be higher where the coke concentration on catalyst is lower, the overall oxygen-containing gas flow rate can be reduced, so the regenerator size and operation cost can be reduced.

Figure 1:
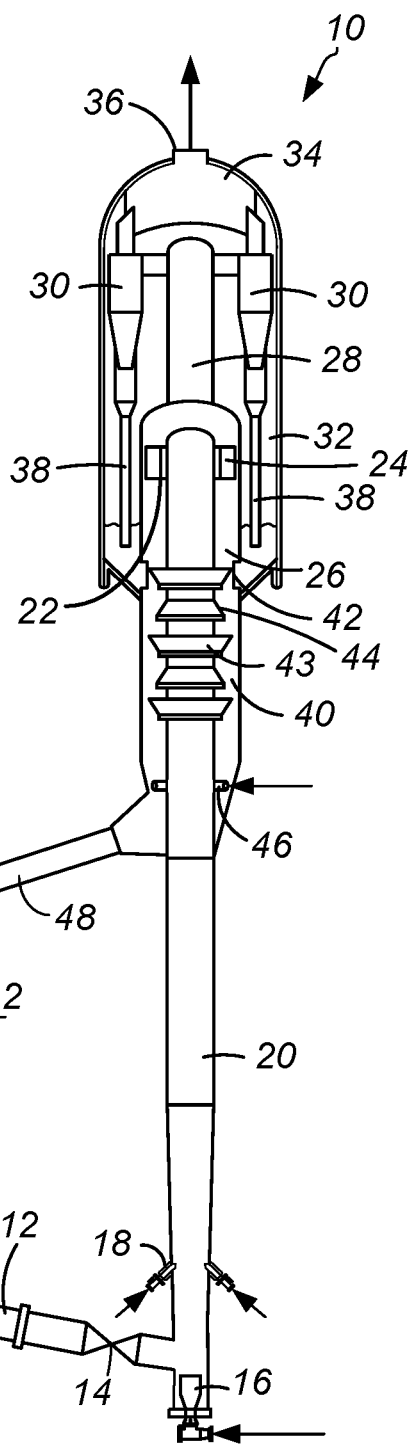
FIG. 1 is a schematic, elevational view of an FCC unit incorporating the present subject matter.

Although other uses are contemplated, the process and apparatus may be embodied in an FCC unit. FIG. 1 shows an FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. An inert fluidization medium such as steam from a nozzle 16 transports regenerated catalyst upwardly through the riser 20 at a relatively high density until a plurality of feed distributor nozzles 18 inject hydrocarbon feed perhaps mixed with inert gas such as steam across the upwardly flowing stream of catalyst particles. The catalyst contacts the hydrocarbon feed cracking it to produce smaller, cracked hydrocarbon products while depositing coke on the catalyst to produce coked catalyst.

A conventional FCC hydrocarbon feedstock and higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of no more than about 340° C. (644° F.), a T5 between about 340° C. (644° F.) to about 350° C. (662° F.), a T95 between about 555° C. (1031° F.) and about 570° C. (1058° F.) and an EP of no more than about 640° C. (1184° F.) prepared by vacuum fractionation of atmospheric residue. Such a fraction is generally low in coke precursors and heavy metal contamination which can serve to contaminate catalyst. Atmospheric residue is a preferred feedstock boiling with an IBP not more than about 340° C. (644° F.), a T5 between about 340° C. (644° F.) and about 360° C. (680° F.) and a T95 of between about 700° C. (1292° F.) and about 900° C. (1652° F.) obtained from the bottom of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction, vacuum reduced crudes. Fresh hydrocarbon feedstocks also include mixtures of the above hydrocarbons and the foregoing list is not comprehensive.

The FCC catalyst includes a large pore zeolite, such as a Y-type zeolite and a matrix material comprising an active alumina material, a binder material, including either silica or alumina, and an inert filler such as kaolin. Suitable FCC catalysts include Amber from Albemarle Corporation located in Baton Rouge, La. The FCC catalyst may also include 1 to 25 wt % of a medium or smaller pore zeolite catalyst, such as a MFI zeolite, dispersed on a matrix including a binder material such as silica or alumina and an inert filler material such as kaolin.

The resulting mixture of cracked hydrocarbon products and coked catalyst continues upwardly through the riser 20 to a top at which a plurality of disengaging arms 22 tangentially and horizontally discharge the mixture of gas and catalyst from a top of the riser 20 through ports 24 into a disengaging vessel 26 that effects a rough separation of gases from the catalyst. A transport conduit 28 carries the hydrocarbon vapors, including stripped hydrocarbons, stripping media and entrained catalyst to one or more cyclones 30 in a reactor vessel 32 which separates coked catalyst from the hydrocarbon vapor stream. The reactor vessel 32 may at least partially contain the disengaging vessel 26, and the disengaging vessel 26 is considered part of the reactor vessel 32. A collection chamber 34 in the reactor vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the reactor vessel 32, and the catalyst and adsorbed or entrained hydrocarbons pass into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The stripped, coked catalyst leaves the stripping section 40 of the reactor vessel 32 through a reactor catalyst conduit 48 and passes to the regenerator vessel 50 at a rate regulated by a control valve 52. The coked catalyst from the reactor vessel 32 usually contains carbon in an amount of from 0.2 to 2 wt %, which is present in the form of coke. Although coke is primarily composed of carbon, it may contain from 3 to 12 wt % hydrogen as well as sulfur and other materials.

The regenerator vessel 50 for combusting coke from catalyst comprises a lower regeneration section 54 and an upper disengaging section 56 joined by an optional frustoconical transition section. The reactor catalyst conduit 48 may extend through a wall 53 of the regenerator vessel 50 in the disengaging section 56 to a coked catalyst distributor 60 for distributing coked catalyst above the regeneration section 54. The coked catalyst distributor 60 comprises a header 62 for receiving coked catalyst from the reactor catalyst conduit 48 and an array of nozzles comprising catalyst inlets 64 for dispensing coked catalyst downwardly from the header 62 into the regeneration section 54. In an aspect, a conduit such as the reactor catalyst conduit 48 may deliver coked catalyst through a wall 58 in the regeneration section 54 of the regenerator vessel 50 at a lower location.

In the regeneration section 54, at least 90% of the combustion of coke on the catalyst occurs. The regeneration section 54 has an upper boundary at the lower end of a frustoconical transition section at which the regenerator vessel 50 begins to transition outwardly to a larger diameter to define the wider disengaging section 56. The outer wall 58 of the regeneration section 54 may be cylindrical. The regeneration section 54 may be apportioned into a plurality of stages 70-78. We have found that two stages of countercurrent contact of coked catalyst and oxygen-containing gas provides increased volume reduction over a single bubbling bed regenerator. Three stages of countercurrent contact provides increased volume reduction, but the increasing benefit of volume reduction begins to incrementally diminish at four and five stages. More than five stages appears to provide less incremental benefit which may not be economically justified.

A first stage 70 is disposed below the catalyst inlets 64 and a flue gas outlet 67. The first stage 70 may be defined on an upside by a first permeable barrier 80. The first permeable barrier 80 extends laterally across the regenerator vessel. In an aspect, the first permeable barrier 80 extends laterally across the entire regeneration section 54 of the regenerator vessel 50 contiguously with the wall 58 of the regeneration section 54. The catalyst distributor 60 delivers coked catalyst above the first stage and in an aspect, the first permeable barrier 80. In additional aspects, the coked catalyst distributor 60 may be disposed in the first stage 70 or still above the first stage 70 with an additional permeable barrier above the coked catalyst distributor 60, but these aspects are not shown.

The first permeable barrier 80 may comprise any structure that allows upward flow of gas and downward flow of catalyst, but inhibits back mixing or upward flow of catalyst that may be entrained in the gas. Consequently, upward movement of catalyst is prevented above the first stage 70 by the first permeable barrier 80 more so than if the first permeable barrier 80 were not present. The first permeable barrier may comprise inclined vanes, gratings, structural packing, baffles, including disc and doughnut baffles, chevrons and shed decks, perforated plates and the like.

A second stage 72 may be disposed below the first stage 70. The second stage 72 may be defined on an upside by a second permeable barrier 82 below the first permeable barrier 80. The second permeable barrier 82 extends laterally across the regenerator vessel 50. In an aspect, the second permeable barrier 82 extends laterally across the entire regeneration section 54 of the regenerator vessel 50 contiguously with the wall 58 of the regeneration section 54. The second permeable barrier 82 may be spaced below the first permeable barrier to define a first chamber 90 therebetween that is devoid of internal structure. The first chamber 90 may extend laterally across the regenerator vessel 50 between the first permeable barrier 80 and the second permeable barrier 82. The second permeable barrier 82 may comprise any structure that allows upward flow of gas and downward flow of catalyst, but inhibits back mixing or upward flow of catalyst that may entrain in the combustion gas, similar or the same as the first permeable barrier 80. It is contemplated that the first chamber 90 may contain further internal structure to inhibit back mixing of catalyst or facilitate contact between catalyst and gas.

A third stage 74 may be disposed below the second stage 72. The third stage 74 may be defined on an upside by a third permeable barrier 84 below the second permeable barrier 82. The third permeable barrier 84 may extend laterally across the regenerator vessel 50. In an aspect, the third permeable barrier 84 extends laterally across the entire regeneration section 54 of the regenerator vessel 50 contiguously with the wall 58 of the regeneration section 54. The third permeable barrier 84 may be spaced apart below the second permeable barrier 84 to define a second chamber 92 therebetween that is devoid of internal structure. The second chamber 92 may extend laterally across the regenerator vessel 50 between the second permeable barrier 82 and the third permeable barrier 84. The third permeable barrier 84 may comprise any structure that allows upward flow of gas and downward flow of catalyst, but inhibits back mixing or upward flow of catalyst that may entrain in the combustion gas, similar or the same as the first permeable barrier 80. It is contemplated that the second chamber 92 may contain further internal structure to inhibit back mixing of catalyst or facilitate contact between catalyst and gas.

A fourth stage 76 may be disposed below the third stage 74. The fourth stage 76 may be defined on an upside by a fourth permeable barrier 86 below the third permeable barrier 84. The fourth permeable barrier 86 may extend laterally across the regenerator vessel 50. In an aspect, the fourth permeable barrier 86 extends laterally across the entire regeneration section 54 of the regenerator vessel 50 contiguously with the wall 58 of the regeneration section 54. The fourth permeable barrier 86 may be spaced apart below the third permeable barrier 86 to define a third chamber 94 therebetween that is devoid of internal structure. The third chamber 94 may extend laterally across the regenerator vessel 50 between the third permeable barrier 84 and the fourth permeable barrier 86. The fourth permeable barrier 86 may comprise any structure that allows upward flow of gas and downward flow of catalyst, but inhibits back mixing or upward flow of catalyst that may entrain in the combustion gas, similar or the same as the first permeable barrier 80. It is contemplated that the third chamber 94 may contain further internal structure to inhibit back mixing of catalyst or facilitate contact of catalyst and gas.

A fifth stage 78 may be disposed below the fourth stage 76. The fifth stage 78 may be defined on an upside by a fourth permeable barrier 88 below the fourth permeable barrier 86. The fifth permeable barrier 88 may extend laterally across the regenerator vessel 50. In an aspect, the fifth permeable barrier 88 extends laterally across the entire regeneration section 54 of the regenerator vessel 50 contiguously with the wall 58 of the regeneration section 54. The fifth permeable barrier 88 may be spaced apart below the fourth permeable barrier 86 to define a fourth chamber 96 therebetween that is devoid of internal structure. The fourth chamber 96 may extend laterally across the regenerator vessel 50 between the fourth permeable barrier 86 and the fifth permeable barrier 88. The fifth permeable barrier 88 may comprise any structure that allows upward flow of gas and downward flow of catalyst, but inhibits back mixing or upward flow of catalyst that may entrain in the combustion gas, similar or the same as the first permeable barrier 80. It is contemplated that the fourth chamber 96 may contain further internal structure to inhibit back mixing of catalyst or facilitate contact between catalyst and gas.

In an embodiment, only five stages of counter-current contact are provided. More or less stages may be provided, but volume reduction diminishes after four or five stages of counter-current contact between coked catalyst and oxygen-containing gas.

A sixth permeable barrier 100 may extend laterally across the regenerator vessel 50. In an aspect, the sixth permeable barrier 100 extends laterally across the entire regeneration section 54 of the regenerator vessel 50 contiguously with the wall 58 of the regeneration section 54. The sixth permeable barrier 100 may be spaced apart below the fifth permeable barrier 88 to define a fifth chamber 98 therebetween that is devoid of internal structure. The fifth chamber 98 may extend laterally across the regenerator vessel 50 between the fifth permeable barrier 88 and the sixth permeable barrier 100. The sixth permeable barrier 100 may comprise any structure that allows upward flow of gas and downward flow of catalyst, but inhibits back mixing or upward flow of catalyst that may entrain in the combustion gas, similar or the same as the first permeable barrier 80. It is contemplated that the fifth chamber 98 may contain further internal structure to inhibit back mixing of catalyst or facilitate contact between catalyst and gas.

Each of the permeable barriers may be supported on the wall 58 of the regeneration section 54 with additional support as necessary. The height of the spacing or chamber 90-98 between permeable barriers 80-88, 100 may be the same as the height of the permeable barrier. In an aspect, the height of the spacing or chamber 90-98 may be about one-half to about three-fourths the height of the permeable barrier above it. Moreover, the height of the spacing or chamber 90-98 between permeable barriers 80-88, 100 may be one-sixth to three-eighths of the diameter of the regeneration section 54. Moreover, the height of the permeable barrier may be as much as one-third of the diameter of the regeneration section 54.

Oxygen-containing gas, typically air, blown in from a combustion gas line 55 is delivered by the distributor 102 through oxygen-containing gas inlets 104 to the combustion section 54 of the regenerator vessel 50. The oxygen-containing gas counter-currently contacts coked catalyst in the lower, regeneration section 54 under flow conditions which will include a superficial gas velocity of 0.3 m/s (1 ft/s) to 2.2 m/s (7 ft/s) and a catalyst density of from about 320 kg/m3 (20 lb/ft3) to about 750 kg/m3 (35 lb/ft3) in the counter-current contacting stages 70-78. The catalyst density will be about 16 kg/m$^3$ (1 lb/ft$^3$) to about 80 kg/m$^3$ (5 lb/ft$^3$) in the dilute phase in the disengaging section 56. The oxygen in the combustion gas contacts the coked catalyst and combusts carbonaceous deposits from the catalyst. Oxygen may be added in proportion to combust coke from the coked catalyst in a partial burn or full burn mode to generate flue gas and regenerated catalyst.

The process of combusting coke from coked catalyst begins with passing a first stream of coked catalyst downwardly from the catalyst distributor 60 through the first stage 70. The catalyst distributor 60 may roughly distribute coked catalyst through its nozzles 64 along the top of the first permeable barrier 80. The first stream of coked catalyst may pass through an opening or openings in the first permeable barrier 80 into the first stage 70. A first stream of oxygen-containing gas is compelled upwardly through the first stage 70 in counter-current contact with the first stream of coked catalyst at high temperature to combust coke deposits from the first stream of coked catalyst. The counter-current contacting occurs in the first chamber 90. The first stream of oxygen-containing gas has been in contact with all of the lower stages and has a large concentration of flue gas and a smaller concentration of oxygen. However, the first stream of coked catalyst in the first stage has the highest concentration of coke deposits. Hence, the high concentration of coke deposits provides a large differential driving force which readily combusts coke in the low oxygen concentration in the first stage 70. Additionally, in the first stage 70 hot oxygen-containing gas highly concentrated in flue gas may strip adsorbed hydrocarbons from the coked catalyst due to less availability of oxygen. Stripping removes adsorbed coke and combustion causes some of the coke deposits to combust from the catalyst to produce flue gas and provides a second stream of coked catalyst including at least partially regenerated catalyst with a lower concentration of coke and a stream of flue gas with a low concentration of oxygen.

The stream of flue gas is propelled upwardly from the first stage 70 through the first permeable barrier 80 and into the disengaging section 56. However, the first permeable barrier 80 inhibits upward movement of the coked catalyst in the first stage, causing it to lose upward momentum and fall downwardly in the first stage 70. Consequently, the second stream of coked catalyst moves downwardly through an opening or openings in the second permeable barrier 82 from the first stage 70 into the second stage 72 below the first stage in opposite direction to the upwardly flowing second stream of oxygen-containing gas. In an aspect, all of the gas from the first stage 70 passes upwardly through an opening or openings in the first permeable barrier 80, and at least 99 wt % of the catalyst from the first stage passes downwardly through an opening or openings in the second permeable barrier 82.

The stream of flue gas may enter into the disengaging section 56 which may have a larger diameter than the combustion section 54, so superficial velocity decreases to allow catalyst to disengage from flue gas which can then be discharged from the flue gas outlet 67 above all the stages 70-78 including the first stage 70. The disengaging section 56 will contain a dilute phase of catalyst with catalyst entrained in the ascending flue gas stream. In an embodiment, the flue gas may be processed through a separation device 106 such as a cyclone to further separate catalyst from flue gas. The separation device 106 may have a flue gas inlet 107 contiguous with the flue gas outlet 67. The separation device 106 centripetally separates flue gas from heavier catalyst particles. Separated catalyst particles will fall down dipleg 110 and may be returned to a stage below the first stage 70, such as the second stage 72 or the third stage 74 as shown in FIG. 1. Flue gas with a lighter loading of catalyst may be removed in flue gas line 108. The separation device 106 may also be disposed in the disengaging section 56 with the dipleg distributing catalyst onto the first stage 70 or other stages 72-78.

A second stream of oxygen-containing gas is propelled upwardly through the second stage 72 in counter-current contact with the second stream of coked catalyst descending from the first stage 70 to combust coke from the second stream of coked catalyst. The second stream of oxygen-containing gas has a larger oxygen concentration than the first stream of oxygen-containing gas in the first stage 70, but the coke concentration on catalyst in the second stage 72 is lower than the first stream of coked catalyst in the first stage. Hence, a differential driving force is maintained to drive combustion of the smaller concentration of coke deposits in the second stream of catalyst. The counter-current contacting may occur in the second chamber 92.

The counter-current contacting of the second stream of coked catalyst and the second stream of oxygen-containing gas combusts coke from the catalyst to produce a third stream of coked catalyst including regenerated catalyst with a reduced concentration of coke deposits and the first stream of oxygen-containing gas including flue gas. The first stream of oxygen-containing gas from the second stage is propelled through the second permeable barrier 82 into the first stage 70. The catalyst in the second stage 72 is inhibited from upward movement by the second permeable barrier 82 and loses its momentum. Consequently, the third stream of coked catalyst moves downwardly through an opening or openings in the third permeable barrier 84 from the second stage 72 into the third stage 74 in opposite direction to the upwardly flowing second stream of oxygen-containing gas. The third second stream of coked catalyst passes the third permeable barrier 84 and enters into the third stage 74. In an aspect, all of the gas from the second stage 72 passes upwardly through an opening or openings in the second permeable barrier 82, and at least 99 wt % of the catalyst from the second stage 72 passes downwardly through an opening or openings in the third permeable barrier 84.

A third stream of oxygen-containing gas is propelled upwardly through the third stage 74 in counter-current contact with the third stream of coked catalyst descending from the second stage 72 to combust coke from the third stream of coked catalyst. The third stream of oxygen-containing gas has a larger oxygen concentration than the second stream of oxygen-containing gas in the second stage 72 because the latter has encountered less coked catalyst, but the coke concentration on the catalyst in the third stream of coked catalyst in the third stage 74 is lower than the coke concentration in the second stream of coked catalyst in the second stage because the third stream of coked catalyst has encountered more oxygen in more stages of counter-current contacting. Hence, a differential driving force is maintained to drive combustion of the smaller concentration of coke deposits in the second stream of catalyst with the larger concentration of oxygen in the third stream of oxygen-containing gas. The counter-current contacting may occur in the third chamber 94.

The counter-current contacting of the third stream of coked catalyst and the third stream of oxygen-containing gas combusts coke from the catalyst to produce a fourth stream of coked catalyst including regenerated catalyst with a reduced concentration of coke deposits and the second stream of oxygen-containing gas including flue gas. The second stream of oxygen-containing gas from the third stage is propelled through the third permeable barrier 84 into the second stage 72. The catalyst in the third stage 74 is inhibited from upward movement by the third permeable barrier 84 and loses its momentum. Consequently, the fourth stream of coked catalyst moves downwardly through an opening or openings in the fourth permeable barrier 86 from the third stage 74 into the fourth stage 76 in opposite direction to the upwardly flowing third stream of oxygen-containing gas. The fourth second stream of coked catalyst passes the fourth permeable barrier 86 and enters into the fourth stage 76. In an aspect, all of the gas from the third stage 74 passes upwardly through an opening or openings in the third permeable barrier 84, and at least 99 wt % of the catalyst from the third stage 74 passes downwardly through an opening or openings in the fourth permeable barrier 86.

A fourth stream of oxygen-containing gas is propelled upwardly through the fourth stage 76 in counter-current contact with the fourth stream of coked catalyst descending from the third stage 74 to combust coke from the fourth stream of coked catalyst. The fourth stream of oxygen-containing gas has a larger oxygen concentration than the third stream of oxygen-containing gas in the third stage 74 because the latter has encountered less coked catalyst, but the coke concentration on the catalyst in the fourth stream of coked catalyst in the fourth stage 76 is lower than the coke concentration in the third stream of coked catalyst in the third stage because the fourth stream of coked catalyst has encountered more oxygen in more stages of counter-current contacting. Hence, a differential driving force is maintained to drive combustion of the smaller concentration of coke deposits in the fourth stream of catalyst with the larger concentration of oxygen in the fourth stream of oxygen-containing gas. The counter-current contacting may occur in the fourth chamber 96.

The counter-current contacting of the fourth stream of coked catalyst and the fourth stream of oxygen-containing gas combusts coke from the catalyst to produce a fifth stream of coked catalyst including regenerated catalyst with a reduced concentration of coke deposits and the third stream of oxygen-containing gas including flue gas. The third stream of oxygen-containing gas from the fourth stage is propelled through the fourth permeable barrier 86 into the third stage 74. The catalyst in the fourth stage 76 is inhibited from upward movement by the fourth permeable barrier 86 and loses its momentum. Consequently, the fifth stream of coked catalyst moves downwardly through an opening or openings in the fifth permeable barrier 88 from the fourth stage 76 into the fifth stage 78 in opposite direction to the upwardly flowing fourth stream of oxygen-containing gas. The fifth stream of coked catalyst passes the fifth permeable barrier 88 and enters into the fourth stage 78. In an aspect, all of the gas from the fourth stage 76 passes upwardly through an opening or openings in the fourth permeable barrier 86, and at least 99 wt % of the catalyst from the fourth stage 76 passes downwardly through an opening or openings in the fifth permeable barrier 86.

A fifth stream of oxygen-containing gas is propelled upwardly through the fifth stage 78 in counter-current contact with the fifth stream of coked catalyst descending from the fourth stage 76 to combust coke from the fifth stream of coked catalyst. The fifth stream of oxygen-containing gas has a larger oxygen concentration than the fourth stream of oxygen-containing gas in the fourth stage 76 because the latter has encountered less coked catalyst. In an embodiment, the fifth stream has encountered very little coked catalyst because the fifth stage may be the last stage and is just above the air distributor 102. However, the coke concentration on the catalyst in the fifth stream of coked catalyst in the fifth stage 76 is very low, much lower than the coke concentration in the fourth stream of coked catalyst in the fourth stage because the fifth stream of coked catalyst has encountered more oxygen in more stages of counter-current contacting. Hence, a differential driving force is maintained to drive combustion of the smaller concentration of coke deposits in the fifth stream of catalyst with the larger concentration of oxygen in the fourth stream of oxygen-containing gas. The counter-current contacting may occur in the fifth chamber 98 to polish off any remaining coke deposits on the catalyst.

The counter-current contacting of the fifth stream of coked catalyst and the fifth stream of oxygen-containing gas combusts coke from the catalyst to produce a sixth stream of coked catalyst including regenerated catalyst with a reduced concentration of coke deposits and the fourth stream of oxygen-containing gas including flue gas. This sixth stream of coked catalyst may have very little coke and be considered fully regenerated catalyst. The fourth stream of oxygen-containing gas from the fifth stage is propelled through the fifth permeable barrier 88 into the fifth stage 76. The catalyst in the fifth stage 78 is inhibited from upward movement by the fifth permeable barrier 88 and loses its momentum. Consequently, the sixth stream of coked catalyst moves downwardly through an opening or openings in the sixth permeable barrier 100 from the fifth stage 78 in opposite direction to the upwardly flowing fifth stream of oxygen-containing gas. The sixth stream of coked catalyst passes through the sixth permeable barrier 100 past the air distributor 102 and may exit from the regenerated catalyst outlet 66 and enter the regenerated catalyst conduit 12. Completely regenerated catalyst regulated by control valve 14 descends the reactor catalyst conduit 12 back to the reactor section 10 and enters the riser 20 where it again contacts feed as the FCC process continues. The regenerated catalyst outlet 66 from the regenerator vessel 50 and the oxygen-containing gas inlets 104 are below all of the stages 70-78 and below all of the permeable barriers 80-88, 100. In an aspect, all of the gas from the fifth stage 78 passes upwardly through an opening or openings in the fifth permeable barrier 88, and at least 99 wt % of the catalyst from the fifth stage 78 passes downwardly through an opening or openings in the sixth permeable barrier 100.

Because in the counter-current contacting of coked catalyst and oxygen-containing gas, the oxygen-containing gas is introduced below a stage 70-78, oxygen in the stage is consumed. We have found that the ratio of carbon dioxide to carbon monoxide maximizes in the middle stages. In stages that are higher in the regenerator but with a lower stage number, less oxygen is available, consequently, a ratio of carbon dioxide to carbon monoxide is lower in the first stage 70 than in the middle stages 72-76. Moreover, in the final stages where coke is less available, the ratio of carbon dioxide to carbon monoxide is lower in the final stage 78 than in the middle stages 72-76 and even than in the initial stage 70. Most importantly, the ratio of carbon dioxide to carbon monoxide is smaller in the first stage than in the second stage and typically all stages with the exception of the final stage 78 in which sufficient residence time may not be available for carbon monoxide to oxidize to carbon dioxide despite the great availability of oxygen. Nevertheless, flue gas exiting the regenerator vessel 50 from the first stage 70 will have a higher concentration of carbon monoxide which can be recovered in a CO boiler with less risk of after burn because the concentration of oxygen in the flue gas is lower in the higher stages with the lower stage numbers.

A portion of the oxygen-containing stream in line 55 may be diverted and fed to one of the stages 70-78 separately from a stream of oxygen-containing gas from the subjacent stage to boost the oxygen concentration in the stage. In FIG. 1, a fresh feed of oxygen-containing gas is optionally diverted in line 57 through a control valve to the fourth stage 76 separately from the fourth stream of oxygen-containing gas ascending from the fifth stage 78. Also in FIG. 1, an interstage oxygen-containing gas inlet 59 may be disposed between the fourth permeable barrier 86 and the fifth permeable barrier 88. The fresh feed of oxygen-containing gas can be fed to any stage including the first stage 70, separately from the first stream of oxygen-containing gas propelled into the first stage upwardly from the second stage 72, by an interstage oxygen-containing gas inlet disposed between the first permeable barrier 80 and the second permeable barrier 82 (not shown).

Although not shown in the Figures, catalyst coolers may be used if needed to cool a stream of coked catalyst such as by indirect heat exchange with liquid water to make steam. The cooled catalyst may be taken from and delivered to one of the stages 70-78, preferably at or below the first stage 70. In another example, a stream of coked catalyst can be taken from a stage at or below the first stage 70, cooled and returned to a stage 72-78 at or below the stage from which it was taken. A catalyst cooler that withdraws catalyst from a stage 70-78, cools it and returns the cooled catalyst to the same or subjacent stage is preferable.

For partial burn conditions, the carbon monoxide concentration in the flue gas stream may be maintained at least at about 200 ppm and preferably at least about 3 mole %, the $CO_2$-to-CO mole ratio may be no more than about 1.0 and preferably no more than about 0.9 and at least about 0.5 and preferably at least about 0.8 and the oxygen concentration in the flue gas stream exiting the first stage 70 may be less than about 0.4 mole % and preferably no greater than about 0.2 mole %. For full burn conditions, the carbon monoxide concentration in the flue gas stream may be maintained at less than about 200 ppm, the $CO_2$-to-CO mole ratio may be at least about 1.0 and the oxygen concentration in the flue gas stream exiting the first stage 70 may be greater than about 0.4 mole %.

If air is the oxygen-containing gas, typically 10 to 12 kg (lbs) of air are required per kg (lb) of coke fed on catalyst to the regenerator vessel 50. The regenerator vessel 50 typically has a temperature of about 594 (1100° F.) to about 760° C. (1400° F.) and preferably about 649 (1200° F.) to about 704° C. (1300° F.). Pressure may be between 173 kPa (gauge) (25 psig) and 414 kPa (gauge) (60 psig). The superficial velocity of the oxygen-containing gas through the stages 70-78 is typically between about 0.3 m/s (1 ft/s) and about 1.2 m/s (4.0 ft/s), and the density of the catalyst in the stages 70-78 is typically between about 400 kg/m3 (25 lb/ft3) and about 750 kg/m3 (47 lb/ft3). The density of the flue gas in the dilute phase in the disengaging section 56 is typically between about 4.8 kg/m3 (0.3 lb/ft3) and about 32 kg/m3 (2 lb/ft3) depending on the characteristics of the catalyst with a superficial velocity of between about 0.6 m/s (2.0 ft/s) and about 1 m/s (3.0 ft/s).

Figure 2:
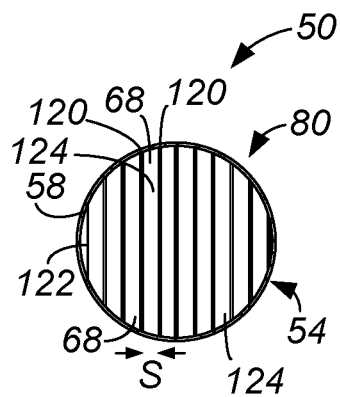
FIG. 2 is a cross section of FIG. 1 taken at segment 2-2.

A plan view of the catalyst regenerator 50 taken at segment 2-2 of FIG. 1 omitting the dipleg 110 illustrating the first permeable barrier 80 is shown in FIG. 2. The first permeable barrier may comprise axial openings or passages 124 between structural components such as plates 68 that have a smallest width at least 10 times and preferably at least 100 times the mean largest diameter of the catalyst. Measurement of the smallest width of the axial openings is conducted normal to the axial direction. The first permeable barrier 80 may comprise an array of plates 68 each oriented angularly to vertical. For example, if the first permeable barrier 80 comprises inclined vanes or plates 68 defining passages 124 as shown in FIGS. 1 and 2, the plates 68 may have a smallest spacing S between plates of about 0.1 m (0.3 foot) to about 1.5 m (5 feet) and preferably about 0.6 m (2 feet) to about 1.2 m (4 feet) apart. Particularly, the smallest spacing S is the horizontal distance between edges 120 of adjacent plates 68. Consequently, much of the catalyst can flow downwardly through the passages 124 between plates 68 without contacting the plates although upward movement will be inhibited by the plates. It is also contemplated that structural components such as plates 68 may also have openings therein for fluidization purposes that may be too small to allow catalyst to permeate through unlike the spacing of the passages 124 between plates 68. However, the plates 68 may be arranged at an incline or vertically to move catalyst and gas laterally in opposite directions while they pass through the first permeable barrier 80 between plates 68. Additionally, lower edges 122 of plates 68 near the wall 58 are positioned to be spaced apart from the wall 58 of the regeneration section 54 of the regenerator vessel 50 to provide downward catalyst passage through the permeable barrier, which as illustrated is the first permeable barrier 80, at the wall 58.

The permeable barriers 80-88, 100 will typically be made of stainless steel such as 304 stainless steel, and supported along the wall 58 of the regeneration section 54.

EXAMPLES

We conducted a kinetic simulation to compare a bubbling bed regenerator to two through five stages of counter-current regenerators. We assumed the following reaction occurred during combustion of coke from catalyst following equation (1)-(5), wherein carbon and hydrogen is sourced in the coke on the catalyst and both catalytic and thermal combustion of carbon monoxide to carbon dioxide occurs:

$$C + 0.5O_2 \rightarrow CO \quad (1)$$

$$C + O_2 \rightarrow CO_2 \quad (2)$$

$$CO + 0.5O_2 \rightarrow CO_2 (\text{catalytic}) \quad (3)$$

$$CO + 0.5O_2 \rightarrow CO_2 (\text{thermal}) \quad (4)$$

$$2H + 0.5O_2 \rightarrow H_2O \quad (5)$$

The reaction rate is first order and can be represented by the following equation (6):

$$[\text{Product}] = k_i * \exp(-E_i/RT) * [O_2] * [\text{Reactant}] \quad (6)$$

in which "[Product]" represents the concentration of product in reaction i, where "i" equals reaction (1)-(5), "[Reactant]" represents the concentration of the reactants in a reaction i, "$k_i$" is the reaction constant for the reaction i, "$E_i$" is the activation energy for the reaction i, "R" is the gas rate constant, "T" is the reaction temperature, and "[$O_2$]" is the oxygen concentration.

Example 1

We conducted a kinetic simulation comparing a bubbling bed regenerator and two to five stages of countercurrent regeneration. The bubbling bed was simulated more rigorously than a single stage continuously stirred tank reactor model in a way that would be used in a computational fluid dynamics simulation. Each stage of the counter-current regenerators was simulated as a continuously stirred tank reactor with no dilute phase of catalyst. All simulation cases used the same total catalyst weight, same total air weight flow rate, same coke weight concentration on coked catalyst and the same target coke concentration on regenerated catalyst. Consequently, each regenerator simulated had to combust the same total mass of coke. For each of the counter-current regenerators, the same total mass of coke had to be combusted in the entire regenerator, but the coke amount combusted in each stage of the counter-current regenerator was determined by the kinetics occurring in equal volumes for each stage.

Figure 3:
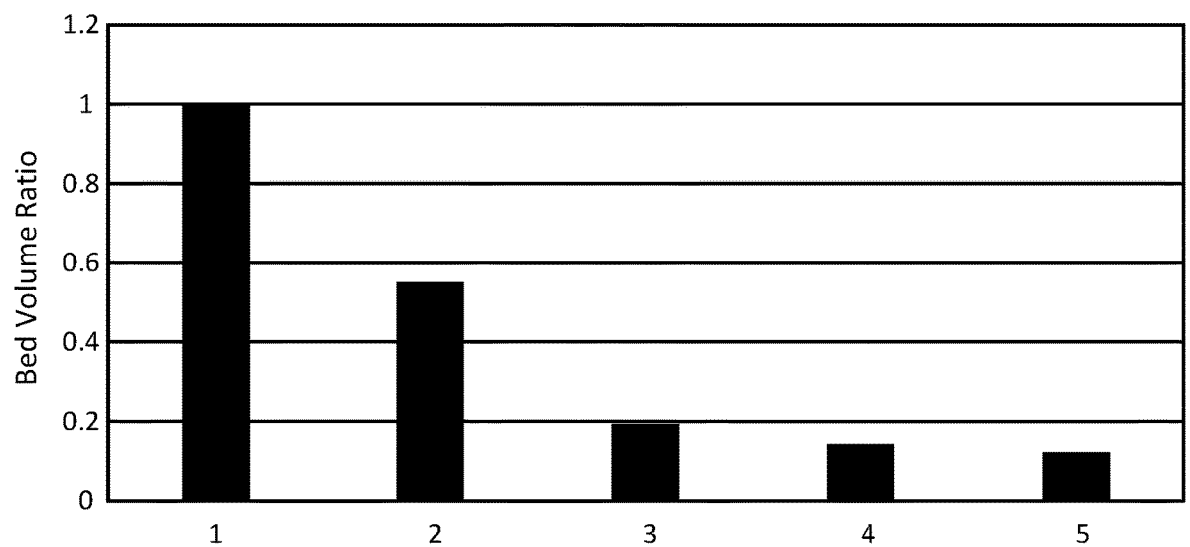
FIG. 3 is a plot of bed volume ratio per number of stages.

FIG. 3 is a graph of a catalyst bed volume ratio for a number of stages. The left axis measures the total catalyst bed volume ratio relative to the catalyst bed volume required for the rigorously simulated bubbling bed regenerator. The horizontal axis labels each of the simulated regenerators from one which represents a bubbling bed regenerator and two to five which represent two to five stages of counter-current regeneration, respectively. Catalyst bed volume ratio is the ratio of the catalyst volume of the entire regenerator, including all of the stages, to the volume of catalyst in only a single-stage bubbling bed regenerator. As illustrated, the two-stage, counter-current regenerator would only require about 55% of the volume for catalyst over two stages, total, to achieve the same coke burn as a bubbling bed regenerator. Hence, the two-stage counter-current regenerator is more efficient than a bubbling bed regenerator. At three stages, the counter-current regenerator only requires 19% of the volume of the bubbling bed regenerator. The decrease in the catalyst bed volume begins to level out after three stages at catalyst bed volume ratios of 0.14 and 0.12 for four and five stages, respectively. Hence, multiple-stage counter-current regenerators can be made smaller than a bubbling bed regenerator.

Figure 4:
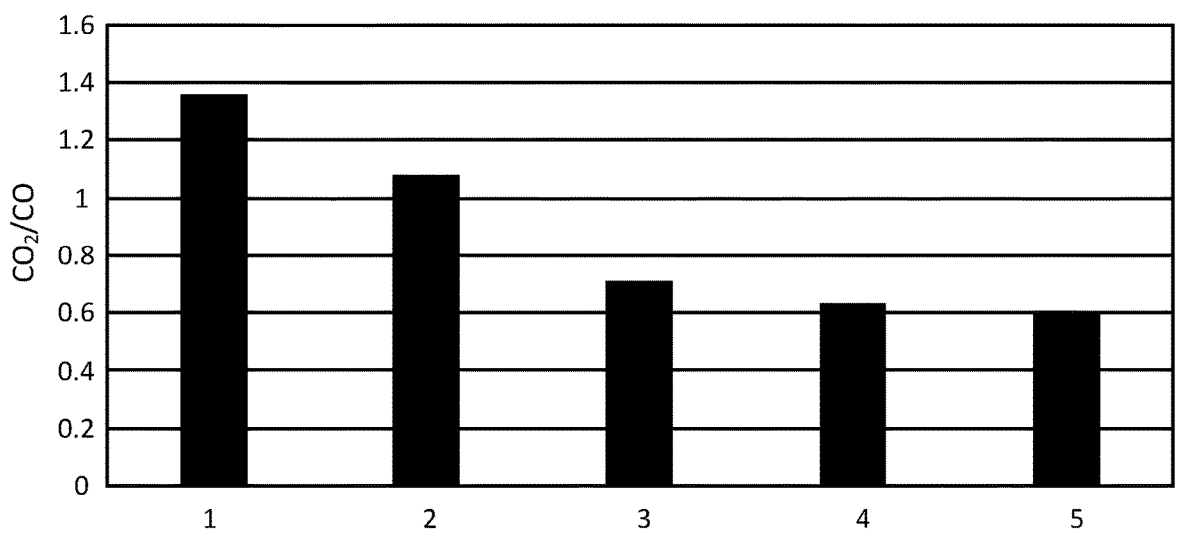
FIG. 4 is a plot of carbon dioxide to carbon monoxide ratio per number of stages.

FIG. 4 is a graph of ratio of carbon dioxide to carbon monoxide on the left axis for a number of stages, the single stage being a bubbling bed regenerator and stages two to five represent counter-current regenerators with two to five stages, respectively. The exit coke concentration is the same for all regenerators simulated because the same mass of coke burn is required for each regenerator. The conventional bubbling bed regenerator has a carbon-dioxide-to-carbonmonoxide ratio of 1.36. The carbon-dioxide-to-carbon-monoxide ratio for a two-stage counter-current is below 1.2 at 1.1 and for a three-stage counter-current regenerator is below about 0.8 at 0.71. The decrease in the carbon-dioxide-to-carbon-monoxide begins to level out after three stages at carbon-dioxide-to-carbon-monoxide ratio of 0.63 at four stages and 0.60 at five stages of counter-current regeneration. The low ratio of carbon dioxide to carbon monoxide indicates that much more high pressure steam can be recovered from the flue gas in a CO boiler because more carbon monoxide is available for fuel.

Example 2

We simulated a counter-current regenerator with five stages of counter-current contact under the same conditions as in Example 1.

Figure 5:
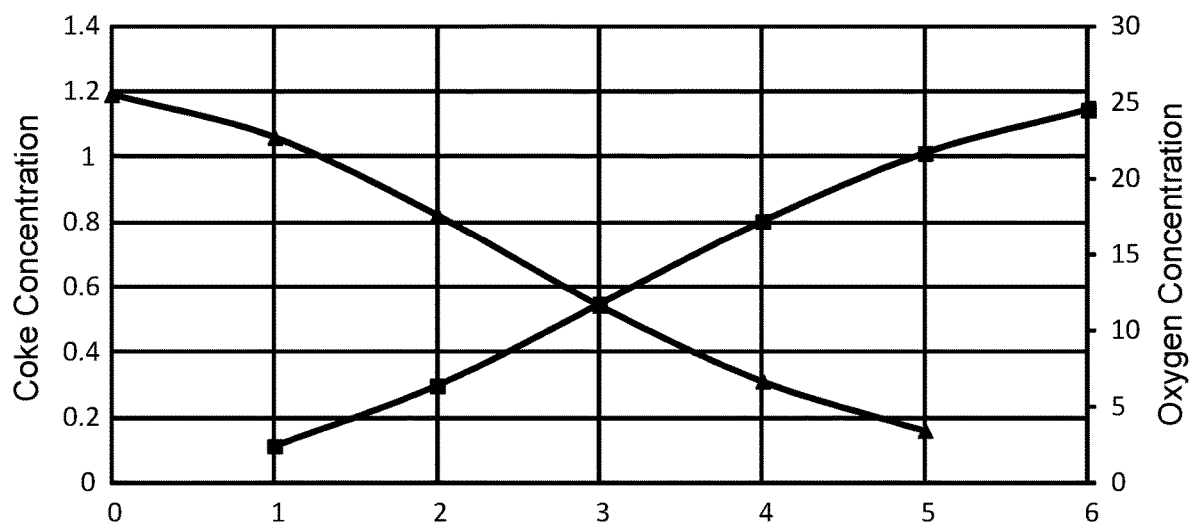
FIG. 5 is a plot of coke concentration and oxygen concentration at each stage.

FIG. 5 is a profile plot of coke concentration on catalyst in weight percent on the left axis and oxygen concentration in the gas on the right axis both in volume percent at each counter-current regeneration stage. Coke concentration is highest at the first stage where the coked catalyst is first delivered to the regenerator and lowest at the fifth stage which is the last stage in this study. Oxygen is highest at the last stage where it is first distributed and lowest at the first stages. The counter-current arrangement allows the greatest concentration of oxygen to be present at the stage where coke concentration is the lowest and hardest to combust and the least concentration of oxygen to be present where the coke concentration is the highest and easiest to combust. Consequently, either high oxygen concentration or high coke concentration is able to drive combustion in counter-current contacting while less oxygen is required for combustion of the same mass of coke.

Figure 6:
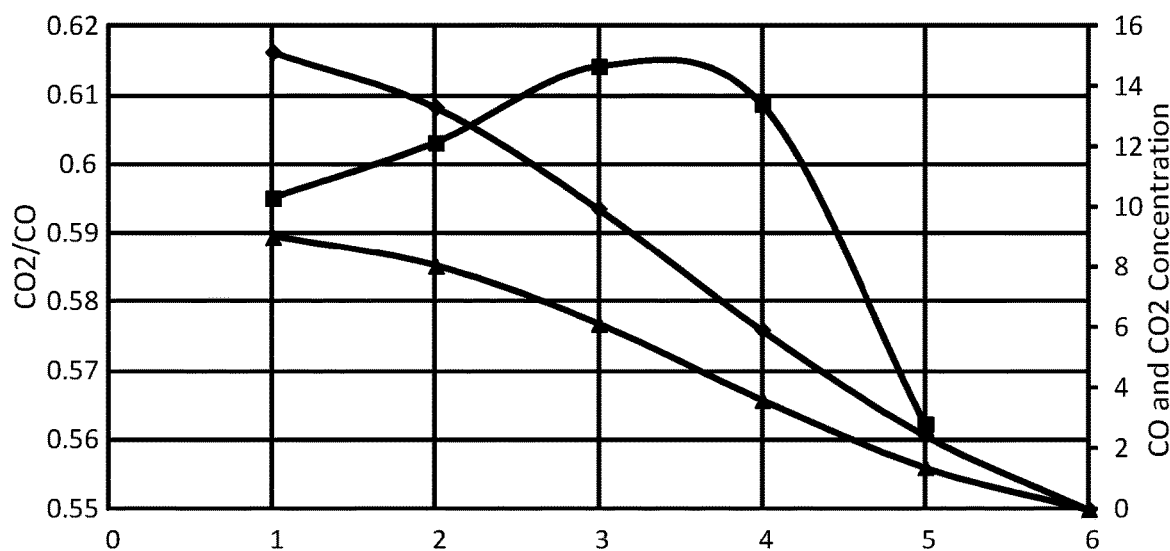
FIG. 6 is a plot of carbon monoxide and carbon dioxide concentration and carbon dioxide to carbon monoxide ratio at each stage.

FIG. 6 is a plot of carbon monoxide and carbon dioxide volume concentration on the right axis and a volume ratio of carbon dioxide to carbon monoxide on the left axis at each stage. Carbon monoxide concentration is represented by the diamonds, carbon dioxide concentration is represented by the triangles and the squares represent the ratio of carbon dioxide to carbon monoxide. Both carbon oxide concentrations increase as the stage number decreases because the carbon monoxide and carbon dioxide product concentrations increase while the oxygen concentration decreases in the oxygen-containing gas streams as the stage numbers decrease which means the oxygen-containing gas fed at the bottom, final stage has been used to combust more coke in each stage progressing from the bottom, final stage upwardly. The ratio of carbon dioxide to carbon monoxide peaks between three and four stages and descends to the lowest at the bottom, final stage in which low coke concentration and high oxygen concentration exists, but conversion of carbon monoxide to carbon dioxide is limited perhaps due to residence time. In the initial stage, high coke concentration and low oxygen concentration create a lean oxygen combustion condition at the top stage. This lean oxygen combustion condition favors formation of carbon monoxide. Therefore, the ratio of carbon dioxide to carbon monoxide starts to decrease at initial stages, and the flue gas leaving the first stage has a lower ratio of carbon dioxide to carbon monoxide. Consequently, oxygen is scavenged by the remaining coke. This surprisingly gives two good results, a rich carbon monoxide flue gas which can provide much fuel for energy production in a CO boiler downstream of the regenerator and a very low level of coke concentration on the regenerated catalyst as it leaves regenerator at the bottom where the oxygen-containing gas is distributed with a high oxygen concentration.

While the subject matter has been described with what are presently considered the preferred embodiments, it is to be understood that the subject matter is not limited to the disclosed embodiments, but it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the invention is a process for combusting coke from coked catalyst comprising passing a first stream of coked catalyst downwardly through a first permeable barrier into a first stage; propelling a first stream of oxygen-containing gas upwardly through the first stage in counter-current contact with the first stream of coked catalyst to combust coke from the first stream of coked catalyst to provide a second stream of coked catalyst including regenerated catalyst and a stream of flue gas; propelling the stream of flue gas upwardly from the first stage; inhibiting upward movement of the first stream of coked catalyst in the first stage; passing the second stream of coked catalyst downwardly from the first stage to a second stage below the first stage; propelling a second stream of oxygen-containing gas upwardly through the second stage in counter-current contact with the second stream of coked catalyst to combust coke from the second stream of coked catalyst to provide a third stream of coked catalyst including regenerated catalyst and the first stream of oxygen-containing gas including flue gas; propelling the first stream of oxygen-containing gas from the second stage to the first stage; and inhibiting upward movement of the second stream of coked catalyst in the second stage. An embodiment of the invention is one, any or all of prior embodiments in this paragraph up through the first embodiment in this paragraph wherein the first permeable barrier inhibits upward movement of the first stream of coked catalyst in the first stage. An embodiment of the invention is one, any or all of prior embodiments in this paragraph up through the first embodiment in this paragraph wherein a second permeable barrier inhibits upward movement of the second stream of coked catalyst in the second stage. An embodiment of the invention is one, any or all of prior embodiments in this paragraph up through the first embodiment in this paragraph wherein the second permeable barrier is spaced below the first permeable barrier. An embodiment of the invention is one, any or all of prior embodiments in this paragraph up through the first embodiment in this paragraph further comprising delivering the first stream of coked catalyst above the first stage and distributing the second stream of oxygen-containing gas below the second stage. An embodiment of the invention is one, any or all of prior embodiments in this paragraph up through the first embodiment in this paragraph further comprising discharging the stream of flue gas from a flue gas outlet above the first stage and removing a stream of regenerated catalyst from an outlet below the second stage. An embodiment of the invention is one, any or all of prior embodiments in this paragraph up through the first embodiment in this paragraph further comprising passing the third stream of coked catalyst downwardly from the second stage to a third stage below the second stage; propelling a third stream of oxygen-containing gas upwardly through the third stage in counter-current contact with the stream of coked catalyst to combust coke from the coked catalyst to provide a fourth stream of coked catalyst comprising regenerated catalyst and the second stream of oxygen-containing gas including flue gas; and inhibiting upward movement of the third stream of coked catalyst in the third stage. An embodiment of the invention is one, any or all of prior embodiments in this paragraph up through the first embodiment in this paragraph wherein a $CO_2$ to CO ratio is smaller in the first stage than in the second stage. An embodiment of the invention is one, any or all of prior embodiments in this paragraph up through the first embodiment in this paragraph further comprising cooling a stream of coked catalyst and delivering cooled catalyst at or below the first stage. An embodiment of the invention is one, any or all of prior embodiments in this paragraph up through the first embodiment in this paragraph further comprising feeding fresh oxygen-containing gas to the first stage separately from the first stream of oxygen-containing gas from the second stage.

A second embodiment of the invention is a process for combusting coke from coked catalyst comprising passing a first stream of coked catalyst downwardly through a first permeable barrier defining a first stage; propelling a first stream of oxygen-containing gas upwardly through the first stage in counter-current contact with the first stream of coked catalyst to combust coke from the first stream of coked catalyst to provide a second stream of coked catalyst including regenerated catalyst and a stream of flue gas; propelling the stream of flue gas upwardly from the first stage through the first permeable barrier; inhibiting upward movement of the first stream of coked catalyst in the first stage by the first permeable barrier; passing the second stream of coked catalyst downwardly from the first stage through a second permeable barrier to a second stage, the second permeable barrier defining the second stage below the first stage; propelling a second stream of oxygen-containing gas upwardly through the second stage in counter-current contact with the second stream of coked catalyst to combust coke from the second stream of coked catalyst to provide a third stream of coked catalyst including regenerated catalyst and the first stream of oxygen-containing gas including flue gas; propelling the first the stream of oxygen-containing gas through the second permeable barrier from the second stage to the first stage; and inhibiting upward movement of the second stream of coked catalyst in the second stage by the second permeable barrier. An embodiment of the invention is one, any or all of prior embodiments in this paragraph up through the second embodiment in this paragraph wherein the second permeable barrier is spaced below the first permeable barrier. An embodiment of the invention is one, any or all of prior embodiments in this paragraph up through the second embodiment in this paragraph further comprising delivering the first stream of coked catalyst above the first permeable barrier and distributing the second stream of oxygen-containing gas below the second stage. An embodiment of the invention is one, any or all of prior embodiments in this paragraph up through the second embodiment in this paragraph further comprising passing the third stream of coked catalyst downwardly from the second stage through a third permeable barrier to a third stage below the second stage, the third permeable barrier defining the third stage below the second stage; propelling a third stream of oxygen-containing gas upwardly through the third stage in counter-current contact with the third stream of coked catalyst to combust coke from the coked catalyst to provide a fourth stream of coked catalyst comprising regenerated catalyst and the second stream of oxygen-containing gas including flue gas; and inhibiting upward movement of the third stream of coked catalyst in the third stage by the third permeable barrier. An embodiment of the invention is one, any or all of prior embodiments in this paragraph up through the second embodiment in this paragraph wherein the third permeable barrier is spaced below the second permeable barrier.

A third embodiment of the invention is a regenerator vessel for combusting coke from coked catalyst comprising a catalyst inlet to the regenerator vessel above a catalyst outlet from the regenerator vessel; a flue gas outlet from the regenerator vessel above an oxygen-containing gas inlet to the regenerator vessel; a first permeable barrier below the catalyst inlet and the flue gas outlet, the first permeable barrier extending laterally across the regenerator vessel; a second permeable barrier below the first permeable barrier to define a second stage above the catalyst outlet, the second permeable barrier extending laterally across the regenerator vessel; and the catalyst outlet and the oxygen-containing gas inlet below the second permeable barrier. An embodiment of the invention is one, any or all of prior embodiments in this paragraph up through the third embodiment in this paragraph wherein the second permeable barrier is spaced below the first permeable barrier. An embodiment of the invention is one, any or all of prior embodiments in this paragraph up through the third embodiment in this paragraph further comprising a third permeable barrier below the second permeable barrier and above the catalyst outlet and the oxygen-containing gas inlet, the third permeable barrier extending laterally across the regenerator vessel. An embodiment of the invention is one, any or all of prior embodiments in this paragraph up through the third embodiment in this paragraph further comprising a separation device with a flue gas inlet above the first permeable barrier. An embodiment of the invention is one, any or all of prior embodiments in this paragraph up through the third embodiment in this paragraph with an oxygen-containing gas inlet disposed between the first permeable barrier and the second permeable barrier.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for combusting coke from coked catalyst comprising:
   passing a first stream of coked catalyst downwardly through a first permeable barrier into a first stage;
   propelling a first stream of oxygen-containing gas upwardly through said first stage in counter-current contact with said first stream of coked catalyst to combust coke from said first stream of coked catalyst to provide a second stream of coked catalyst including regenerated catalyst and a stream of flue gas;

propelling said stream of flue gas upwardly from said first stage; inhibiting upward movement of said first stream of coked catalyst in said first stage;

passing said second stream of coked catalyst downwardly from said first stage to a second stage below said first stage;

propelling a second stream of oxygen-containing gas upwardly through said second stage in counter-current contact with said second stream of coked catalyst to combust coke from said second stream of coked catalyst to provide a third stream of coked catalyst including regenerated catalyst and said first stream of oxygen-containing gas including flue gas; and propelling said first stream of oxygen-containing gas from said second stage to said first stage; and inhibiting upward movement of said second stream of coked catalyst in said second stage.

2. The process of claim 1 wherein said first permeable barrier inhibits upward movement of said first stream of coked catalyst in said first stage.

3. The process of claim 2 wherein a second permeable barrier inhibits upward movement of said second stream of coked catalyst in said second stage.

4. The process of claim 3 wherein said second permeable barrier is spaced below said first permeable barrier.

5. The process of claim 1 further comprising delivering said first stream of coked catalyst above said first stage and distributing said second stream of oxygen-containing gas below said second stage.

6. The process of claim 1 further comprising discharging said stream of flue gas from a flue gas outlet above said first stage and removing a stream of regenerated catalyst from an outlet below said second stage.

7. The process of claim 1 further comprising:

passing said third stream of coked catalyst downwardly from said second stage to a third stage below said second stage;

propelling a third stream of oxygen-containing gas upwardly through said third stage in counter-current contact with said stream of coked catalyst to combust coke from said coked catalyst to provide a fourth stream of coked catalyst comprising regenerated catalyst and said second stream of oxygen-containing gas including flue gas; and inhibiting upward movement of said third stream of coked catalyst in said third stage.

8. The process of claim 1 wherein a $CO_2$ to CO ratio is smaller in the first stage than in the second stage.

9. The process of claim 1 further comprising cooling a stream of coked catalyst and delivering cooled catalyst at or below said first stage.

10. The process of claim 1 further comprising feeding fresh oxygen-containing gas to said first stage separately from said first stream of oxygen-containing gas from said second stage.

11. A process for combusting coke from coked catalyst comprising:

passing a first stream of coked catalyst downwardly through a first permeable barrier defining a first stage;

propelling a first stream of oxygen-containing gas upwardly through said first stage in counter-current contact with said first stream of coked catalyst to combust coke from said first stream of coked catalyst to provide a second stream of coked catalyst including regenerated catalyst and a stream of flue gas;

propelling said stream of flue gas upwardly from said first stage through said first permeable barrier;

inhibiting upward movement of said first stream of coked catalyst in said first stage by said first permeable barrier;

passing said second stream of coked catalyst downwardly from said first stage through a second permeable barrier to a second stage, said second permeable barrier defining said second stage below said first stage;

propelling a second stream of oxygen-containing gas upwardly through said second stage in counter-current contact with said second stream of coked catalyst to combust coke from said second stream of coked catalyst to provide a third stream of coked catalyst including regenerated catalyst and said first stream of oxygen-containing gas including flue gas;

propelling said first said stream of oxygen-containing gas through said second permeable barrier from said second stage to said first stage; and inhibiting upward movement of said second stream of coked catalyst in said second stage by said second permeable barrier.

12. The process of claim 11 wherein said second permeable barrier is spaced below said first permeable barrier.

13. The process of claim 11 further comprising delivering said first stream of coked catalyst above said first permeable barrier and distributing said second stream of oxygen-containing gas below said second stage.

14. The process of claim 11 further comprising: passing said third stream of coked catalyst downwardly from said second stage through a third permeable barrier to a third stage below said second stage, said third permeable barrier defining said third stage below said second stage; propelling a third stream of oxygen-containing gas upwardly through said third stage in counter-current contact with said third stream of coked catalyst to combust coke from said coked catalyst to provide a fourth stream of coked catalyst comprising regenerated catalyst and said second stream of oxygen-containing gas including flue gas; and inhibiting upward movement of said third stream of coked catalyst in said third stage by said third permeable barrier.

15. The process of claim 14 wherein said third permeable barrier is spaced below said second permeable barrier.

* * * * *